United States Patent
Wada et al.

(10) Patent No.: US 6,714,236 B1
(45) Date of Patent: Mar. 30, 2004

(54) SECURITY CAMERA SYSTEM AND DISPLAYING METHOD BY SECURITY CAMERA

(75) Inventors: Jyoji Wada, Yokohama (JP); Katsumi Yano, Yokohama (JP); Koji Wakiyama, Yokohama (JP); Haruo Kogane, Kawasaki (JP); Kazushige Tamura, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 604 days.

(21) Appl. No.: 09/660,326

(22) Filed: Sep. 12, 2000

(30) Foreign Application Priority Data

Sep. 14, 1999 (JP) .......................... 11-261078

(51) Int. Cl.⁷ ............................................. H04N 7/18
(52) U.S. Cl. ....................................... 348/152
(58) Field of Search ............................. 348/143, 152, 348/153, 156, 155; H04N 7/18

(56) References Cited

U.S. PATENT DOCUMENTS

| | | | | |
|---|---|---|---|---|
| 5,751,346 A | * | 5/1998 | Dozier et al. | 348/153 |
| 6,069,655 A | * | 5/2000 | Seeley et al. | 348/154 |
| 6,084,510 A | * | 7/2000 | Lemelson et al. | 348/143 |
| 6,271,752 B1 | * | 8/2001 | Vaios | 340/541 |
| 6,356,664 B1 | * | 3/2002 | Dunn et al. | 382/239 |
| 6,437,819 B1 | * | 8/2002 | Loveland | 348/143 |
| 2002/0067412 A1 | * | 6/2002 | Kawai et al. | 348/143 |

FOREIGN PATENT DOCUMENTS

| | | |
|---|---|---|
| JP | 9502331 | 12/1995 |
| JP | 10229511 | 8/1998 |

* cited by examiner

*Primary Examiner*—Nhon Diep
(74) *Attorney, Agent, or Firm*—Stevens, Davis, Miller & Mosher, LLP.

(57) ABSTRACT

To provide a security camera system for displaying a picture so as to easily know a place where an abnormal situation occurs. The security camera system includes a security camera 61 having at least more than one rotation axis and a controller 70 for controlling the security camera 61. The controller 70 is provided with a moving picture detector 80 for detecting a motion from pictures taken by the security camera during an automatic monitoring operation. The controller switches an operation of the security camera from automatic monitoring to still monitoring in the case when the moving picture detector detects a motion from monitored pictures. Therefore, in the case when a suspicious person, fire smoke, or the like is detected in a subject building at night, for example, during an automatic monitoring operation for shooting target monitoring places sequentially, a shooting point of the security camera is fixed there so as to shoot and display an abnormal situation on a monitor screen.

15 Claims, 8 Drawing Sheets

| ID | PAN | TILT | ZOOM | FOCUS | DISPLAY | ALLOWABLE PANNING ANGLE | ALLOWABLE TILTING ANGLE |
|---|---|---|---|---|---|---|---|
| 1 | P 1 | T 1 | Z 1 | F 1 | SOUTH ENTRANCE HALL | ± a 0 | ± b 0 |
| 2 | P 2 | T 2 | Z 2 | F 2 | ELEVATOR HALL, LEFT | ± a 0 | ± b 0 |
| 3 | P 3 | T 3 | Z 3 | F 3 | ELEVATOR HALL, RIGHT | ± a 0 | ± b 0 |
| 4 | P 4 | T 4 | Z 4 | F 4 | FRONT ENTRANCE HALL | ± a 0 | ± b 0 |
| 5 | P 5 | T 5 | Z 5 | F 5 | WC | ± a 0 | ± b 0 |
| 6 | P 6 | T 6 | Z 6 | F 6 | SECURITY ROOM | ± a 0 | ± b 0 |
| 7 | P 7 | T 7 | Z 7 | F 7 | NORTH ENTRANCE HALL | ± a 0 | ± b 0 |
| 8 | P 8 | T 8 | Z 8 | F 8 | MEETING ROOM | ± a 0 | ± b 0 |
| 9 | P 9 | T 9 | Z 9 | F 9 | WEST ENTRANCE HALL | ± a 0 | ± b 0 |
| 10 | P 10 | T 10 | Z 10 | F 10 | DOOR TO SALES DEPT. | ± a 0 | ± b 0 |

(b)

| TIME STAMP | COMMAND |
|---|---|
| 00000001 | COMMAND PRESET ID 1 |
| 00000006 | COMMAND PRESET ID 2 |
| 00000012 | COMMAND PRESET ID 3 |
| 00000018 | COMMAND PRESET ID 4 |
| 00000022 | COMMAND PRESET ID 5 |
| 00000033 | COMMAND PRESET ID 6 |
| 00000039 | COMMAND PRESET ID 7 |
| 00000045 | COMMAND PRESET ID 8 |
| 00000051 | COMMAND PRESET ID 9 |
| 00000056 | COMMAND PRESET ID 10 |

FIG.5

| ID | MONITORING PLACE | DISPLAY TIME |
|---|---|---|
| 1 | SOUTH ENTRANCE HALL | 5 sec |
| 2 | ELEVATOR HALL, LEFT | 5 sec |
| 3 | ELEVATOR HALL, RIGHT | 5 sec |
| 4 | FRONT ENTRANCE HALL | 5 sec |
| 5 | W C | 3 sec |
| 6 | SECURITY ROOM | 10 sec |
| 7 | NORTH ENTRANCE HALL | 5 sec |
| 8 | MEETING ROOM | 5 sec |
| 9 | WEST ENTRANCE HALL | 5 sec |
| 10 | DOOR TO SALES DEPT. | 5 sec |

FIG.6

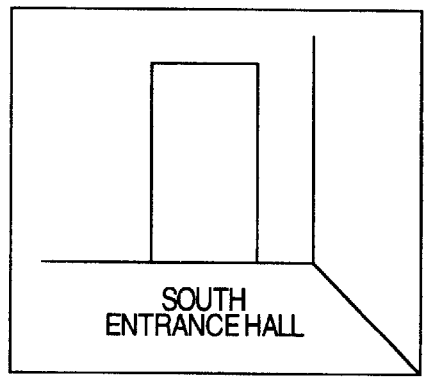

FIG.7

|  | PANNING ANGLE | TILTING ANGLE |
|---|---|---|
| 1ST ROUTE | Pt − Pit | \| Tt \| − \| Ti \| |
| 2ND ROUTE | 360 − Pt − Pi | \| Tt \| − \| Ti \| |
| 3RD ROUTE | Pt − ( Pi + 180 ) | \| Tt \| + \| Ti \| |
| 4TH ROUTE | 180 − Pt − Pi | \| Tt \| + \| Ti \| |

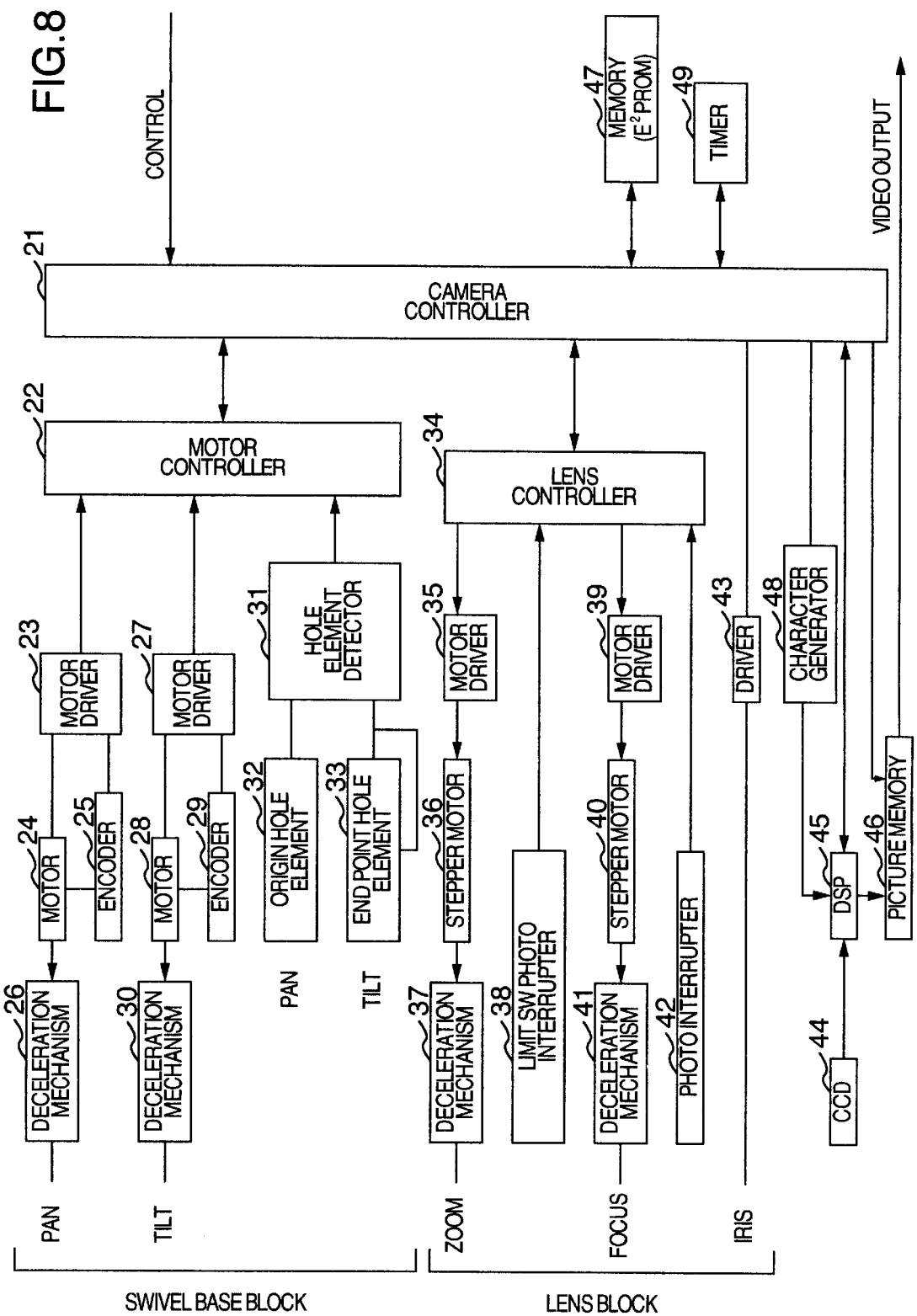

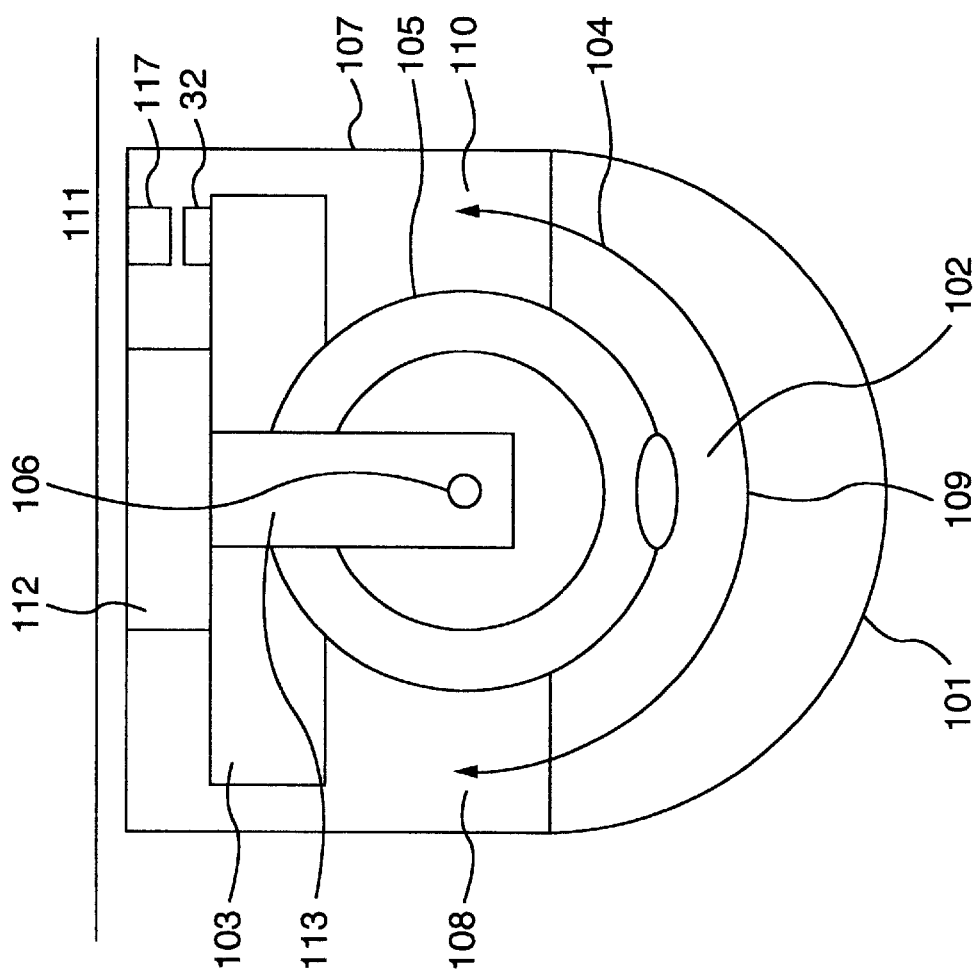

SECURITY CAMERA SYSTEM AND DISPLAYING METHOD BY SECURITY CAMERA

BACKGROUND OF THE INVENTION

The present invention relates to a security camera system composed of a security camera and its controller, as well as a method for displaying pictures taken by the security camera, more particularly to a method for displaying a picture properly in response to an occurrence of an abnormal situation.

PRIOR ART

Conventionally, there have been sold security cameras with both camera and camera swivel base integrated in a doomed housing respectively. Because this type of cameras can be adjusted in both panning (horizontal rotation) and tilting (vertical rotation) directions in accordance with the rotation of the swivel base, they are referred to as composite cameras. Each of those composite cameras can be panned 360° endlessly and tilted within 0° to 90°, that is, rotated in both horizontal and vertical directions. Thus, this composite camera, when it is installed, for example, on the ceiling of public facilities, can take pictures in any desired direction.

However, such the composite camera, which can change its shooting direction freely, has been confronted with a problem that it is difficult to obviously judge a place where an abnormal situation occurs just from the monitored pictures.

Under such circumstances, it is an object of the present invention to provide a security camera system that can solve such the conventional problem and display pictures so that a place, in the case where an abnormal situation occurs there, can be known easily, as well as a method for displaying pictures taken by the security camera.

SUMMARY OF THE INVENTION

In order to attain the above object, the security camera system composed of a security camera having more than one rotation axis and a controller for controlling the security camera according to the present invention provides the controller with moving picture detecting means for detecting a motion in the pictures taken by the security camera during an automatic monitoring operation. In addition, in the case when the moving picture detecting means detects a motion in the monitored pictures, the controller switches the operation of the security camera from automatic monitoring to still monitoring.

Furthermore, the controller is composed so as to hold both monitored pictures during an automatic monitoring operation and monitoring history data including the data of monitoring places and monitoring times.

Furthermore, the controller is provided with picture recognizing means for recognizing human faces looking up at the security camera from the monitored pictures. The faces recognized by the picture recognizing means and the shooting times are recorded.

Furthermore, the method for displaying pictures taken by the security camera according to the present invention enables information to be added to pictures taken by the security camera and displayed on the monitor screen in case the controller detects a motion among the pictures taken by the security camera.

Furthermore, the controller that holds monitored pictures taken by the security camera during an automatic monitoring operation and monitoring history including data of both monitoring places and monitoring times can replay a monitored picture of a monitoring place repetitively in the case when the place is selected from the monitoring history.

Consequently, a shooting point can be fixed so as to display the picture of the abnormal situation detected there in case a suspicious person, fire smoke, or the like is detected in the subject building at night during an automatic monitoring operation for shooting monitoring targets sequentially.

Furthermore, it is possible to recognize an occurrence of an abnormal situation by checking monitored pictures and monitoring history data held in the controller.

It is also possible to record human faces looking up at the security camera so as to check the security system.

BRIEF DESCRIPTION OF THE DRAWINGS

FIG. 3 is a view showing a data structure employed for a preset table (a) and an auto tracing table (b) in the embodiment according to the present invention;

FIG. 5 is a view showing a monitoring place history data in the embodiment according to the present invention;

FIG. 6 is a view showing a picture taken by the composite camera in the embodiment according to the present invention;

FIG. 7 is data denoting both panning and tilting angles in each of the composite camera movement routes for calculating an optimized route in the embodiment according to the present invention;

FIG. 8 is a block diagram of the composite camera in the embodiment according to the present invention;

FIG. 9 is a side cross sectional view of a structure of the composite camera in the embodiment according to the present invention.

PREFERRED EMBODIMENTS OF THE INVENTION

First Embodiment

The group of the inventor et al concerning the present invention has developed a new composite camera that can pan by 360° endlessly and tilt by 180°. This composite camera, since the degree of freedom in the moving direction is increased such way, can catch a tar'get place quickly via the shortest route.

Hereunder, a description will be made for a security camera system that uses this composite camera in preferred embodiments of the present invention.

Figure 10:
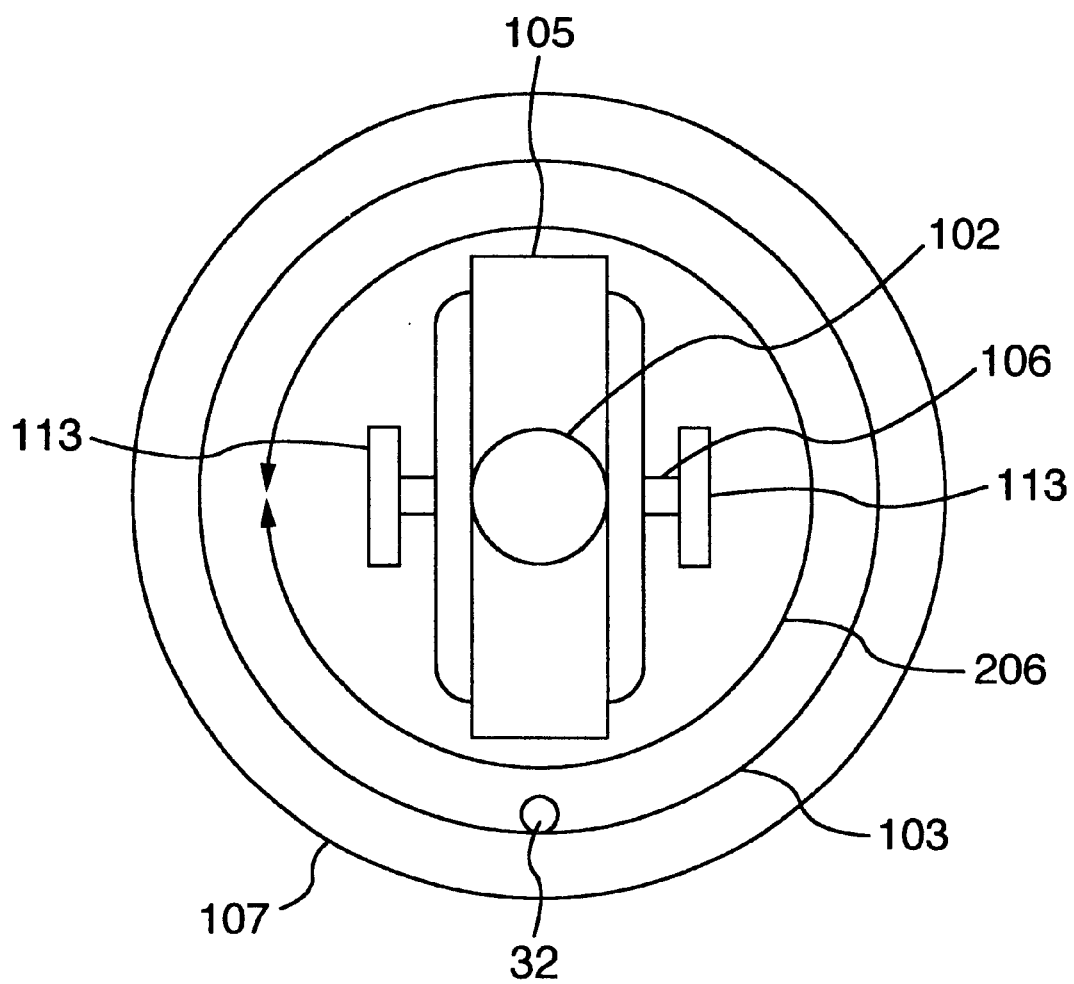
FIG. 10 is a top cross sectional view of the structure of the composite camera in the embodiment according to the present invention.

This composite camera, as shown in FIG. 9 (side cross sectional view) and FIG. 10 (top view), comprises a security camera 102; a tilt-and-swivel base 105 for holding the camera 102 directly; a pan-and-swivel base 103 that can pan by 360° endlessly; a pair of supports 113 erected from the pan-and-swivel base 103; a tilting shaft 106 for fixing the tilt-and-swivel base 105 to this pair of supports 113; and a slip ring 112 that functions as a contact for supplying an electric power and inputting/outputting an electric signal to/from the housing. All of those items are integrated in a housing composed of a cylindrical camera base 107 and a hemispheric camera cover. Although not illustrated here, the composite camera is also provided with a motor for driving the rotating mechanisms of the pan-and-swivel base 103 and the tilt-and-swivel base 104; a motor drive controller, an amplifier for amplifying video signals, a controller for controlling the operation of the composite camera, etc. In addition, a magnet 117 is fixed at the reference point of the housing so as to decide a rotation reference point in the panning direction and the pan-and-swivel base 103 is provided with an origin hall element 32 for detecting the magnetic field of this magnet 117.

The tilt-and-swivel base 105 for holding the camera 102 can be rotated by 180° around the tilting shaft 106. Consequently, the camera 102 can be turned up to the point C (110) reversibly from the point A (108) shown in FIG. 9 via the lowest point B (109).

The pan-and-swivel base 103, as its rotation trail 206 is shown in FIG. 10, can be rotated by 360° horizontally.

The slip ring 112 enables supply of an electric power from a fixed portion to a movable portion, as well as conducting of an electric signal between the fixed portion and the movable portion.

Consequently, in the case when this composite camera is attached on a ceiling, the rotation angle of the tilt-and-swivel base 105 is adjusted, and the pan-and-swivel base 103 is rotated in a predetermined direction by remote controlling from the controller, then the camera 102 can shoot a target monitoring area in every direction.

FIG. 8 shows a functional block diagram of an inside configuration of this composite camera. The rotation controlling mechanism (swivel base block) employed for both of the pan-and-swivel base 103 and the tilt-and-swivel base 105 comprises motors 24 and 28; encoders 25 and 29 for detecting the rotation speeds of the motors 24 and 28; motor drivers 23 and 27 for driving the motors 24 and 28 according to the detection results of the encoders 25 and 29; deceleration mechanisms 26 and 30 for decelerating the rotations of the motors 24 and 28, thereby transmitting the decelerated powers to the pan-and-swivel base 103 and the tilt-and-swivel base 105; an origin hole element 32 disposed on the pan-and-swivel base 103 and enabled to induce the magnetic field of the magnet 117 disposed at the reference point of panning; an end point hole element 33 disposed on the tilt-and-swivel base 105 so as to be separated by 180° from the base 105 and enabled to induce the magnetic field of the magnet disposed at the end point of tilting; a hole element detector 31 for detecting the origin of panning and the end point of tilting from detection signals of the hole elements 32 and 33; and a motor controller 22 for controlling the motor drivers 23 and 27 according to the detection result of the hole element detector 31.

Furthermore, the controlling mechanism of the camera lens block comprises stepper motors 36 and 40 for adjusting both zooming and focusing; motor drivers 35 and 39 for outputting drive pulses to the stepper motors 36 and 40; deceleration mechanisms 37 and 41 for decelerating the rotation speeds of the stepper motors 36, 40, thereby transmitting the decelerated powers to the lens mechanism; a limit switch or photo interrupter 38 for detecting a limit in zooming adjustment; a photo interrupter 42 for detecting a limit in focusing adjustment; lens controller 34 for controlling the motor drivers 35 and 39; and a driver 43 for adjusting an iris.

The camera block for outputting video signals is composed of a CCD 44 for shooting; a DSP 45 for encoding video signals; a character generator 48 for generating character strings and graphics to be superimposed on pictures; and a picture memory 46 for writing/reading picture data in/from itself.

The camera block is also provided with a camera controller 21 for controlling the operation of the composite camera according to control signals received from the controller; a memory ($E^2PROM$) 47 for storing data; and a timer 49 for counting a time.

In this composite camera, the output pulse from the encoder 25 for detecting the rotation of the motor 24 in panning is transmitted to the motor controller 22 and the timing of the origin hole element 32 for detecting the reference point of panning is transmitted to the motor controller 22 via the hole detector 31. The motor controller 22 counts the number of output pulses m from the encoder 25 after the origin hole element 32 detects the reference point of panning in case p is assumed for the number of pulses output from the encoder 25 while the pan-and-swivel base is rotated once.

$$Pt = m \times 360/p$$

Then, the current panning angle Pt is calculated as shown above. The calculated current panning angle Pt is held in the memory 47.

In the same way, the output pulse from the encoder 29 for detecting the rotation of the motor 28 in tilting is transmitted to the motor controller 22 and the timing of the end point hole element 33 for detecting the tilting end point is transmitted to the motor controller 22 via the hole detector 31. The motor controller 22 counts the number of pulses n output from the encoder 29 after the end point hole element 33 detects the tilting end point in case q is assumed for the number of pulses output from the encoder 29 while the tilt-and-swivel base is rotated by a half turn.

$$Tt = 90 - (n \times 180/q)$$

Then, the current tilting angle Tt is calculated as shown above. Concretely, a tilting angle is calculated by assuming the just-under direction as 0. The limit range of a tilting angle is within +90° to −90°. The calculated current tilting angle Tt is held in the memory 47.

The view angle to be shot by the lens block is decided by the rotating quantity of the stepper motor 36 for limiting the zoom ratio. The rotating distance of the stepper motor 36 is decided by the number of pulses output from the stepper motor 36. In the same way, the focal length of the lens block is decided by the number of pulses output to the stepper motor 40. The lens controller 34 counts the pulses output so as to rotate the stepper motor 36, 40 in the positive direction as plus pulses and the pulses output so as to rotate the stepper motor 36, 40 in the negative direction as minus pulses, thereby accumulating the number of pulses output from the motor driver 35, 39. This number of accumulated pulses is stored in the memory 47 as data representing the current view angle Zt and the focal length Ft.

The memory 47 holds Pt, Tt, Zt, and Ft as data representing the current state quantity of the composite camera such way.

Figure 1:
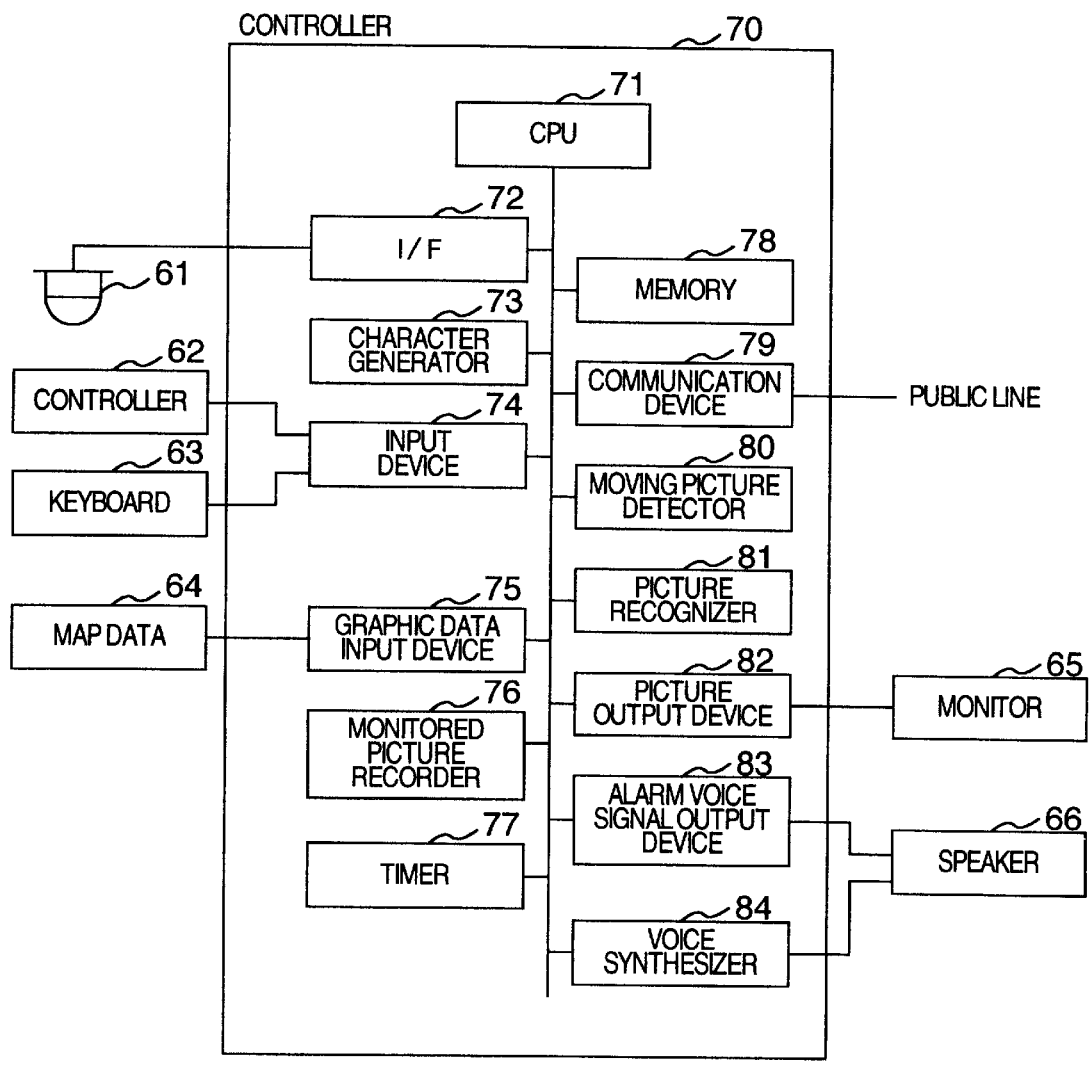
FIG. 1 is a block diagram showing a configuration of a security camera system in an embodiment according to the present invention.

This composite camera, as shown in FIG. 1, is connected to the controller 70 via a coaxial cable and to the controller 62 and the monitor 65 via this controller 70 respectively.

The controller 70 is composed of an interface 72 with the composite camera 61; a character generator 73 for generating character strings and graphics in response to received codes; an input device 74 for receiving signals from the controller 62 and the keyboard 63; a graphic data input device 75 for receiving map data 64 of a monitoring area; a monitored picture recorder 76 for recording monitored pictures, etc.; a timer 77 for counting a time; a memory 78 for storing registered information; a communication device 79 for communicating via a public line; a moving picture detector 80 for detecting a motion from pictures taken by the composite camera 61; a picture recognizer 81 for recognizing pictures; a picture output device 82 for outputting pictures to the monitor 65; an alarm voice signal output device 83 for outputting an alarm signal to a speaker 66; a voice synthesizer 84 for outputting a synthesized voice; and a CPU 71 for controlling the operation of the controller 70.

In this embodiment, the controller 70 is connected to the composite camera 61 and the monitor 65. However, a plurality of composite cameras and a plurality of monitors may be connected to the controller 70, so that the controller 70 controls the monitors for outputting pictures taken by those composite cameras respectively.

Figure 2:
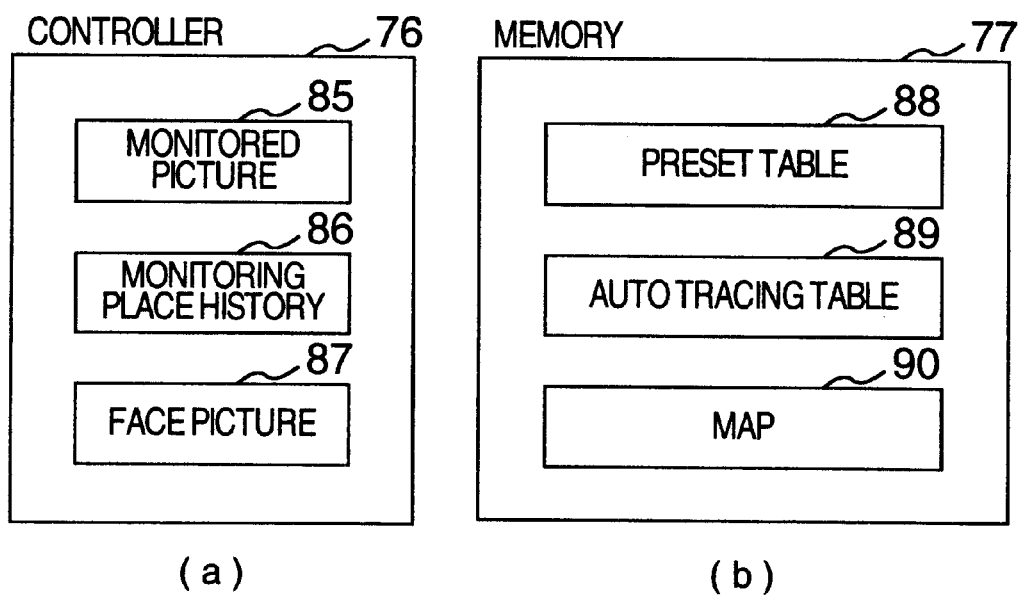
FIG. 2 is a view showing data recorded in a monitored picture recorder (a) and a memory (b) of a controller in the embodiment according to the present invention.

The memory 77 of the controller 70 stores a preset table 88 in which monitoring targets are registered; an auto tracing table 89 in which an automatic monitoring procedure is registered; and a map 90 denoting a monitoring area of the composite camera as shown in FIG. 2(b).

In the preset table 88, as shown in FIG. 3(a), are described a preset point ID; a panning angle, a tilting angle, a zoom ratio, and a focal length of the camera oriented to each of monitoring targets; a display character string denoting a monitoring target; and allowable angles for specifying allowable ranges of panning and tilting angles so as to display a character string on the screen.

There are some methods for registering data in the preset table 88. After the composite camera is displayed at a predetermined point, for example, in a building, the composite camera is turned to an actual monitoring target and the camera state quantity is recorded. Then, the preset point is registered.

Figure 4:
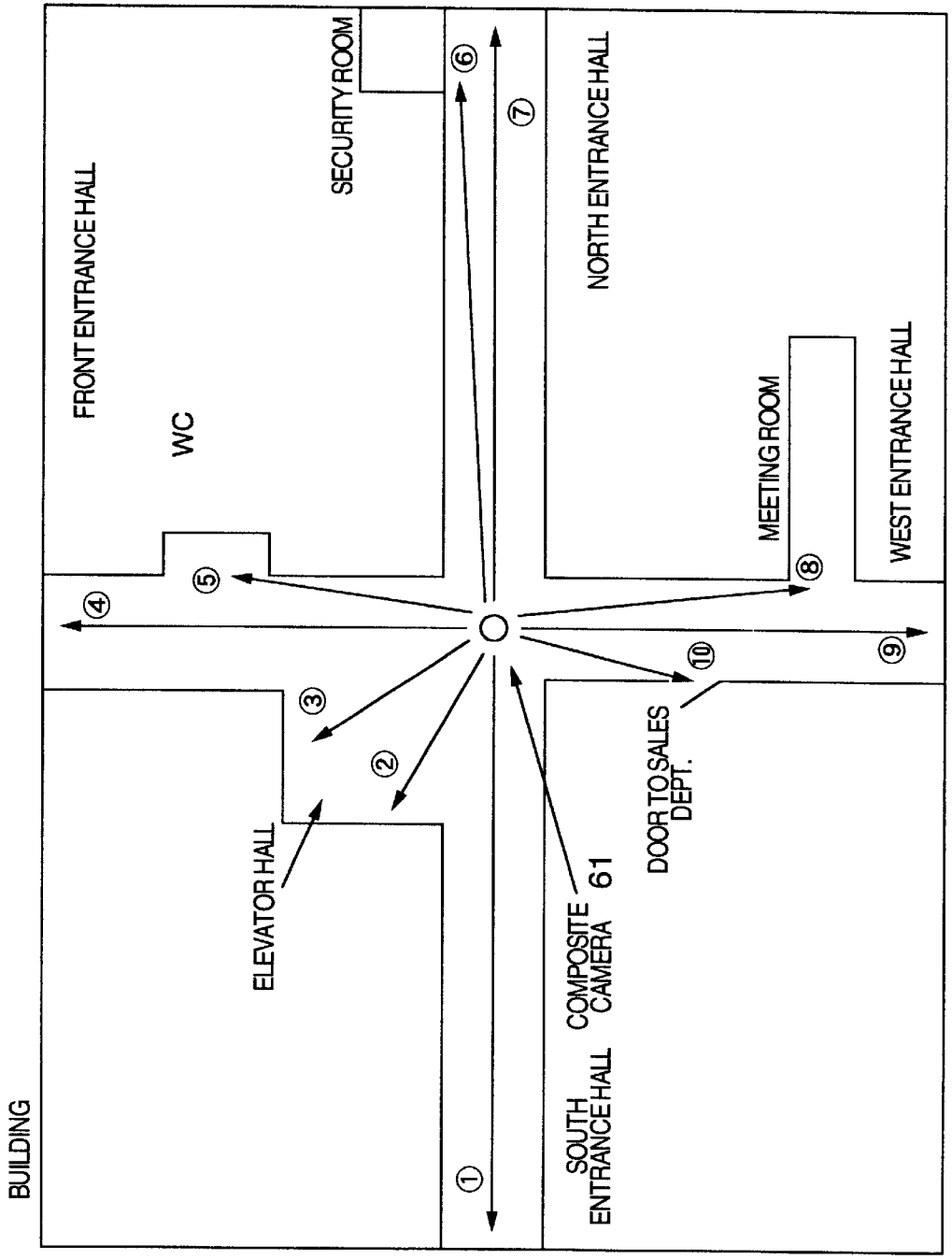
FIG. 4 is a view showing a monitoring area of a composite camera.

For example, assume now that the composite camera 61 is installed in a building shown in FIG. 4.

In the case when an operator inclines, for example, the joystick of the controller 62 so as to change the orientation of the composite camera, then a signal denoting both the size of the inclination and the inclined direction of the joystick are entered to the controller 70 via the input device 74. The CPU 71 of the controller 70 then converts this signal to a command for controlling the speed of the camera in movement and sends the command to the composite camera 61 via the interface 72.

The camera controller 21 of the composite camera 61 translates the received command and sends the received speed control data to the motor controller 22. The motor controller 22 then controls the motor drivers 23 and 27 so as to pan and tilt the camera at the specified speed.

In the case when the operator returns the joystick of the controller 62 to the neutral position, a command for specifying a speed of 0 is sent from the controller 70 to the composite camera 61 as described above so that the rotation of the camera is stopped in both tilting and panning directions.

When the camera turns to a different target, the current panning angle Pt and the current tilting angle Tt of the camera are held in the memory 47 of the composite camera 61 and both zoom ratio Zt and focal length Ft that are adjusted automatically by the automatic focusing mechanism are held in the memory 47.

By operating the controller 62 such way, the operator turns the camera towards the south entrance hall of the building shown in FIG. 4, which is one of the monitoring targets and adjusts the zoom ratio and the focal length as needed. Then, the operator decides an ID denoting the south entrance hall and enters a command for the preset registration of the ID from the keyboard 63. Receiving this command, the CPU 71 of the controller 70 sends a command requesting the composite camera 61 for transfer of the current state quantity to itself. Consequently, the composite camera 61 transfers the data Pt, Tt, Zt, and Ft held in its memory 47 to the controller 70. Those Pt, Tt, Zt, and Ft are thus written together with the ID in the preset table 88 of the memory 78.

The operator also enters a display character string of "South Entrance Hall" denoting this monitoring target from the keyboard 63 and the display character code is thus written in the display field of the preset table 88. And, the allowable values (+/−a0) and (+/−b0) of the panning angle and the tilting angle are preset.

Each monitoring target is registered in the preset table 88 with such the operation executed for each of the monitoring targets "Elevator Hall, Left", "Elevator Hall, Right", "Front Entrance Hall", etc. shown in FIG. 4.

This preset point can also be specified by using of a monitoring area map of the composite camera. In this case, graphic data denoting the monitoring area of the composite camera, for example, a top view shown in FIG. 4, is entered to the controller 70 via the graphic data input device 75 as map data 64. This map data 64 is recorded as a map 90 in the memory 78. This graphic data may also be entered with use of CAD data in designing of buildings.

In the case when data is to be preset for registration, this map data is read from the memory 78 and displayed on the monitor 65. The operator specifies the preset point on this map with use of a mouse, etc. The CPU 71 calculates both panning and tilting angles of the composite camera corresponding to this specified point information entered via the input device 74 and sends a command to the composite camera 61 so as to adjust the orientation of the camera to the panning and tilting angles.

The controller 21 of the composite camera 61 calculates a difference between the current panning/tilting angle held in the memory 47 and the panning/tilting angle specified from the controller 70 respectively, thereby controlling the motor controller 22 so as to adjust the camera orientation in the panning and tilting directions according to an angle equivalent to the calculated difference.

In the case when the composite camera turns to a specified point on the map such way, the operator recognizes the camera angle on the monitor 65, then decides the ID of the point and enters the preset registration command for the ID from the keyboard 63. Hereinafter, the operations are the same as those described above; the Pt, Tt, Zt, and Ft data denoting the current state quantity of the camera held in the memory 47 of the composite camera 61 are transferred to the controller 70, thereby the data is written together with the ID in the preset table 88 of the memory 78. The display character code entered by the operator from the keyboard 63 is also written in the preset table 88 at this time.

After data is registered in the preset table 88 such way, the composite camera can be turned to a monitoring target by specifying the preset ID and the display character string denoting the monitoring target registered in this preset table 88.

For example, in the case when the operator specifies "South Entrance Hall" from the keyboard 63 so as to turn the composite camera 61 to the specified target point, the CPU 71 of the controller 70 searches the preset point "South Entrance Hall" displayed in the display field from the preset table 88 of the memory 78 and reads the panning angle Pt, the tilting angle Tt, the zoom ratio Zt, and the focal length Ft of the preset point and transfers those data items to the composite camera so that the camera is turned to the preset point.

The camera controller 21 of the composite camera 11 translates the received command and calculates the shortest route of the camera moving from the current point specified by the panning and tilting angles Pi and Ti held in the memory 47 to the target point denoted by the panning and tilting angles Pt and Tt specified from the controller 70.

In this composite camera, there are four moving routes from the current camera point (Pi, Ti) to one target camera point (Pt, Tt).

The first route is a route reaching the target camera point by clockwise panning and tilting in the same area (in the case when the current tilting angle is in the positive area, it is tiling in the positive area and in case the current tilting angle is in the negative area, it is the tilting in the negative area).

The second route is a route reaching the target camera point by counter-clockwise panning and tilting in the same area.

The third route is a route reaching the target camera point by tilting into a different area (tilting into the negative area from the positive area or into the positive area from the negative area by passing 0° respectively) and clockwise panning.

The fourth route is a route reaching the target camera point by tilting into a different area and the counter-clockwise panning.

Both panning and tilting angles in each of those routes are as shown in FIG. 7. The controller 21 of the composite camera 61 recognizes a larger rotation angle of the panning and tilting angles in each of the above routes, thereby selecting the route whose rotation angle is the minimum as the shortest route. This is because the time of arrival in a target camera point is decided by a larger rotation angle of panning and tilting angles in case the camera is panned and tilted so as to be positioned at the target point.

The camera controller 21, after selecting the shortest route, instructs the motor controller 22 to pan and tilt the camera according to the panning and tilting angles in the selected route.

The motor driver 23 rotates the motor 24 by a panning angle specified via the motor controller 22. Then, the motor driver 23 stops the rotation of the motor 24 when detecting from the output from the encoder 25 that the motor 24 has been rotated by a specified angle. In the same way, the motor driver 27 rotates the motor 28 by a tilting angle specified via the motor controller 22 and stops the rotation of the motor 28 when detecting from the output from the encoder 29 that the motor 28 has been rotated by a specified angle. And, the camera controller 21 passes the zoom ratio Zt and the focal length Ft sent from the controller 70 to the lens controller 34 so as to instruct the lens controller 34 to adjust the lens state to the received data.

The composite camera 61 then begins shooting the south entrance hall.

The CCD 44 takes a picture in the direction in which the camera is turned and outputs the video signals to the DSP 45. The DSP 45 then encodes the picture. The encoded picture data is written in the picture memory 46 once and read from the picture memory 46 so as to be transferred to the controller 70.

In case the camera is tilted into a difference area via 0° in the selected shortest route (concretely, in the case when the third or fourth route is selected), the picture data is read from the picture memory 46 in the reverse order. Consequently, it is prevented that the picture is displayed upside down on the monitor.

To change a switching point (camera position) so as to read picture data actually from the picture memory, two points other than the point where the tilting angle is 0° are set and the direction for reading picture data is switched when the tilting angle goes into the negative area by passing one of the set points. And, in case the tilting angle goes into the positive area by passing the other point, the change of the direction for reading picture data is reset. In case a hysteresis is given to the change of the direction for reading picture data such way, it is possible to prevent a picture from frequently occurrence of upside down around those switching points.

The CPU 71 of the controller 70, when receiving picture data from the composite camera 61, sends a display character code described in the display field of the corresponding monitoring target in the preset table 88 to the character generator 73 so as to let the generator 73 output a character display pattern. The picture output device 82 generates a display picture obtained by superimposing this character display pattern on the picture data sent from the composite camera 61 and outputs the picture onto the monitor 65. The monitor 67 displays the picture on which the display character string denoting the monitoring target is superimposed as shown in FIG. 6.

Another display character string is displayed just after that on the monitor 67 in case both panning and tilting angles are within their allowable ranges defined in the preset table 88 even when the operator changes the camera orientation around a preset point by operating the controller 62.

Next, an automatic monitoring operation will be described.

In this automatic monitoring operation, the operator operates the composite camera first, thereby the composite camera learns the monitoring operation for each of a plurality of monitoring targets sequentially. After this, the composite camera repeats the learned monitoring operation automatically.

In the case when the operator directs beginning of learning from the keyboard 63 during learning of auto tracing, the controller 70 actuates the timer 77. Hereinafter, the controller 70 records each command issued to the composite camera 61 in response to an operation of the operator in the auto tracing table 89 of the memory 78. Before the command is written in the auto tracing table 89, the command is added with a time stamp from the timer 77.

The operator, after entering an ID for specifying an auto tracing operation (ex., ID=0001), specifies, for example, ID1 for "South Entrance Hall" registered in the preset table 88 in FIG. 4 so as to turn the camera in the direction and observe the picture for a predetermined time. Next, the operator specifies ID2 for "Elevator Hall, Left" registered in the preset table 88 so as to turn the camera in the direction and observe the picture for a predetermined time. Specifying monitoring targets one by one such way, the operator turns the composite camera towards each target, thereby each command and a time stamp denoting the command-issued time are written in the auto tracing table 89 of the memory 78 as shown in FIG. 3(b).

In the case when the operator controls the orientation of the composite camera by controlling the controller 62 during this learning operation, the command issued according to this operation is written together with its time stamp in the auto tracing table 89.

Next, the operator, at the time of beginning automatic monitoring in an auto tracing manner, enters the ID from the keyboard 63 so as to begin the auto tracing. In the case when the current time matches with the preset time, the controller 70 begins auto tracing specified by the preset ID.

At this time, the CPU 71 of the controller 70 initializes the timer 49 and reads both commands and time stamps sequentially from the auto tracing table 89 stored in the memory 78. And, the controller 70 sends each of those commands to the composite camera 61 synchronously with the count time of the timer 77, thereby letting the composite camera 61 execute the command.

Because the data is read from the auto tracing table 89 synchronously with the count time of the timer 77 as described above, the composite camera 61 can make a learned monitoring operation automatically.

A picture shot by the composite camera 61 during an automatic monitoring operation is displayed on the monitor 65 and written in the monitored picture recorder 76 of the controller 70 as a monitored picture 85. This monitored picture 85 is one of the monitored pictures and it is held for a fixed time. Newly entered picture data is overwritten on the picture data that has passed a predetermined fixed time. Written pictures in the monitored picture recorder 76 are thus updated sequentially. A target monitored up to a predetermined time is recorded as monitoring place history data 86 as shown in FIG. 5 and other history data are added to the data 86 while data is replayed from the auto tracing table 89 sequentially.

The moving picture detector 80 of the controller 70 takes a difference between picture frames of the composite camera 61 during an automatic monitoring operation, thereby detecting a motion from pictures taken by the composite camera, that is, such an abnormal situation as a person and/or animal coming into an off-limit area, smoke and flame of a fire, a person coming into a subject building at night and/or on holiday while coming and goings of people are limited.

The CPU 71 of the controller 70, when the moving picture detector 80 detects a motion from the pictures taken by the composite camera, checks the current monitoring place of the composite camera from the monitored place history data 86 in the monitored picture recorder 76. And, in the case when the monitoring place is specified as a point where an abnormal situation should be processed in the case when a motion is detected in the pictures taken by the composite camera, the CPU 71 takes a countermeasure for the detected abnormal situation as described below.

At first, the controller 70 stops the auto tracing of the composite camera 61, then shifts the camera 61 into a still monitoring operation. The controller 70 then transfers the motion point detected from the monitored pictures to the composite camera 61, thereby enabling the composite camera 61 to be focused at the motion point. The composite camera 61 controls both panning and tilting so as to set the motion point in the center of the screen. The composite camera is thus focused on the object in the center of the screen due to the auto focusing mechanism. The state quantities Pt, Tt, Zt, and Ft of the composite camera 61 are transferred to the controller 70. The CPU 71 of the controller 70 then converts the focal length Ft to a character string in the character generator 73 and controls the picture output device 82 so as to superimpose a value denoting this focal length on the picture. And, in the case when both Pt and Tt agree to the panning and tilting angles including their allowable angles defined in the preset table 88, the corresponding display character string is superimposed on the picture. As a result, both a focal length and a character string denoting a near-by monitoring target are superimposed on the picture taken by the composite camera 61 and displayed on the screen of the monitor 65.

The CPU 71 enables the alarm voice signal output device 83 to generate an alarm voice signal. In some cases, the CPU 71 also enables the voice synthesizer 84 to given a voice to a character string denoting a monitoring target as needed. Voices representing the alarm and the monitoring target are output from the speaker 66.

Furthermore, the CPU 71 reads the map 90 from the memory 77 and controls the picture output device 82 so as to display this map on part of the screen of the monitor 65. Then, the CPU 71 calculates a position corresponding to the state quantities Pt and Tt of the composite camera 61 on this map and instructs the picture output device 82 to blink the calculated position on the map on the screen.

Furthermore, the CPU 71 may let the character generator 73 output a character string "Abnormal Situation Detected" and display this character string so as to be superimposed on the picture.

In the case when a guard in charge of monitoring is away from the security system area due to a patrol in the building, the communication device 79 calls the specified portable telephone number of the guard automatically according to the instruction from the CPU 71. When the guard in charge of monitoring responses to the call, the voice voice-synthesized by the voice synthesizer 84 for notifying the guard of an occurrence of an abnormal situation and/or the nearest monitoring target is informed to the guard in charge through the portable telephone. By receiving the call, the guard can rush to the scene, return to the controller 70, replay the monitored picture 85 on the monitor 65 recorded in the monitored picture recorder 76, and/or display the monitoring place history 86 on the monitor 65 so as to recognize the detected abnormal situation.

In the case when one monitoring target is selected from the monitoring place history data 86, the CPU 71 of the controller 70 reads only the picture corresponding to the monitoring target from the monitored pictures 85 and controls so as to replay the picture repetitively.

A person, in the case when he/she is watching the security camera carefully, might possibly be checking the security system with an evil design. This is why the picture recognizer 81 of the controller 70 recognizes human faces looking up at the composite camera from pictures monitored by the composite camera 61. The CPU 71 records part of each picture recognized by the picture recognizer 81 as a human face in the monitored picture recorder 76 as a face picture 87 with both date and time added to it.

Because this security camera system records monitored pictures and the monitoring place history data within a fixed time in the monitored picture recorder such way, an abnormal situation detected point can be easily checked by referencing to both monitored pictures and monitoring places in the case when an abnormal situation is detected.

Furthermore, this security camera system can detect such motions as a person coming into the subject building at night and/or on holiday, as well as smoke of a fire, etc.

And, because a character string denoting a nearby monitoring target and being superimposed on the picture is displayed on the screen, it is possible to easily know a place where a suspicious person comes in and/or a fire breaks out.

Furthermore, because a focal length value is displayed on the screen, the guard in charge can recognize the distance to an abnormal situation detected point from the composite camera accurately.

Furthermore, because an alarm sound is output from a speaker at this time, the guard in charge can notice occurrence of an abnormal situation even when he/she is away from the scene.

Furthermore, in the case when a synthesized voice is output from a speaker so as to denote a nearby monitoring target, the guard in charge can recognize the abnormal situation detected point even when he/she is away from the scene.

In the case when a monitoring area map is displayed on the monitor screen and an abnormal situation detected point is displayed on the map, the guard in charge can know the point at a glance.

Furthermore, while the guard in charge is patrolling in a subject building, an occurrence of an abnormal situation is notified to the portable telephone of the guard automatically, so the guard can take a quick response to the situation.

Furthermore, the security camera system can record faces of suspicious persons who are checking the security system.

While both preset table and auto tracing table are stored in the memory 78 of the controller 70 in the above embodiment, those tables may be stored in the memory 47 of the composite camera 61. In this case, a character string denoting a monitoring target and displayed so as to be superimposed on a picture is generated by the character generator 48 of the composite camera 61. And, the timer 49 of the composite camera is used to count a time for learning of auto tracing and/or automatic monitoring.

Furthermore, while the security camera system has been described with respect to a composite camera that can be panned by 360° and tiled by 180° in the above embodiment, the present invention can also apply to other security cameras having more than one rotation axis respectively.

As apparent from the above description, the security camera system of the present invention can display an abnormal situation detected point so as to be known easily, thereby enabling the guard in charge to take proper countermeasures in the case when such the abnormal situation takes place.

What is claimed is:

1. A security camera system, comprising:
   a security camera having more than one rotation axis; and
   a controller for controlling said security camera; wherein
   said controller includes motion detecting means for detecting a motion from pictures taken by said security camera during an automatic rotating operation, and
   said controller stops the automatic rotating operation of said security camera in the case that said motion detecting means detects said motion.

2. The security camera system according to claim 1, wherein said controller further includes alarm generating means for outputting an alarm signal in the case when said moving picture detecting means detects said motion.

3. The security camera system according to claim 1, wherein said controller further includes voice synthesizing means for outputting a synthesized voice denoting a target place in the case when said moving picture detecting means detects said motion.

4. The security camera system according to claim 1, wherein said controller further includes communicating means, which uses a public line, for automatically calling a specific phone number in the case when said moving picture detecting means detects said motion.

5. The security camera system according to claim 1, wherein said controller further includes character generating means for generating a character string denoting an abnormal situation and superimposing said character string on a picture in the case when said moving picture detecting means detects said motion.

6. The security camera system according to claim 1, wherein said controller holds graphic data of a monitoring area, and said controller is controlled so as to display said graphic data on which a motion detected point is denoted in the case when said moving picture detecting means detects said motion.

7. A security camera system, comprising:
   a security camera having more than one rotation axis; and
   a controller for controlling said security camera, wherein
   said controller includes motion detecting means for detecting a motion from pictures taken by said security camera during an automatic rotating operation,
   said controller stops the automatic rotating operation of said security camera if said motion detecting means detects said motion, and
   said controller records monitored pictures taken by said security camera, during an automatic monitoring operation, and monitoring history data including monitoring places and monitoring times of said security camera.

8. The security camera system according to claim 7, wherein said monitored pictures and said monitoring history data are accumulated only for a fixed time, so that older monitored pictures and monitoring history data are sequentially discarded so as to accumulate newer monitored pictures and monitoring history data.

9. The security camera system according to claim 7, wherein a monitored picture of a monitoring place is selected from said accumulated monitored pictures and replayed repetitively in case said monitoring place is selected from said monitoring history data.

10. A security camera system, comprising:
    a security camera having more than one rotation axis; and
    a controller for controlling said security camera, wherein
    said controller includes motion detecting means for detecting a motion from pictures taken by said security camera during an automatic rotating operation,
    said controller stops the automatic rotating operation of said security camera if said motion detecting means detects said motion, and
    said controller includes picture recognizing means for recognizing a human face looking up at said security camera from among said pictures taken by said security camera, and said controller records both said human face recognized by said picture recognizing means and its shooting time.

11. The method for displaying pictures taken by said security camera according to claim 10, wherein said additional information displayed together with said one picture is a character string denoting an occurrence of an abnormal situation.

12. The method for displaying pictures taken by a security camera according to claim 10, wherein said additional information is a focal length of said security camera, said added information being displayed together with said one picture.

13. The method for displaying pictures taken by a security camera according to claim 10, wherein said added information is graphic data of a monitoring area, said added information being displayed together with said one picture.

14. A method for displaying pictures taken by a security camera, which has more than one rotation axis, in a security camera system that includes a controller for controlling said security camera, the method comprising:

detecting, with a motion detector of said controller, motion from pictures taken by said security camera during an automatic rotating operation;

stopping, with said controller, the automatic rotating operation of said security camera if said motion detector detects said motion in said pictures taken by said security camera;

adding additional information to one of the pictures taken by said security camera; and displaying said one picture with the additional information when said controller detects said motion.

15. A method for displaying pictures taken by a security camera, which has more than one rotation axis, in a security camera system that includes a controller for controlling said security camera, the method comprising:

detecting, with a motion detector of said controller, motion from pictures taken by said security camera during an automatic rotating operation;

stopping, with said controller, the automatic rotating operation of said security camera if said motion detector detects said motion in pictures taken by said security camera;

holding, with said controller, monitored pictures taken by said security camera, during an automatic monitoring operation, and monitoring history data including both monitoring place and monitoring time of said security camera; and repetitively replaying a monitored picture of a monitoring place if said monitoring place is selected from said monitoring history data, wherein said monitoring place is included in said monitored pictures.

* * * * *